(12) United States Patent
Scharpf

(10) Patent No.: US 12,271,962 B2
(45) Date of Patent: *Apr. 8, 2025

(54) CROSS-BORE RISK ASSESSMENT AND RISK MANAGEMENT TOOL

(71) Applicant: Hydromax USA, LLC, Evansville, IN (US)

(72) Inventor: Matthew Scharpf, Louisville, KY (US)

(73) Assignee: HYDOMAX USA, LLC, Evansville, IN (US)

( * ) Notice: Subject to any disclaimer, the term of this patent is extended or adjusted under 35 U.S.C. 154(b) by 114 days.

This patent is subject to a terminal disclaimer.

(21) Appl. No.: 18/163,642

(22) Filed: Feb. 2, 2023

(65) Prior Publication Data

US 2023/0177623 A1 Jun. 8, 2023

Related U.S. Application Data

(63) Continuation of application No. 16/452,922, filed on Jun. 26, 2019.

(Continued)

(51) Int. Cl.
*G06Q 50/06* (2024.01)
*G06N 20/00* (2019.01)
(Continued)

(52) U.S. Cl.
CPC ............. *G06Q 50/06* (2013.01); *G06N 20/00* (2019.01); *G06Q 10/0635* (2013.01); *G06T 11/60* (2013.01); *G06T 2210/56* (2013.01)

(58) Field of Classification Search
CPC .... G06Q 50/06; G06Q 10/0635; G06N 20/00; G06T 11/60; G06T 2210/56
(Continued)

(56) References Cited

U.S. PATENT DOCUMENTS

| | | |
|---|---|---|
| 8,375,032 B2 | 2/2013 | Birdwell et al. |
| 8,583,386 B2 | 11/2013 | Armon et al. |

(Continued)

FOREIGN PATENT DOCUMENTS

| | | |
|---|---|---|
| CH | 720477 | 8/2024 |
| CN | 10135757 | 1/2009 |

(Continued)

OTHER PUBLICATIONS

Dasari, et al., "Web-Based Platform for Force Main Infrastructure Asset Management", retrieved from the internet, https://vtechworks.lib.vt.edu/bitstream/handle/10919/72246/Dasari_V_T_2016.pdf, Aug. 13, 2016, p. 30.

(Continued)

*Primary Examiner* — Abdallah A El-Hage Hassan
(74) *Attorney, Agent, or Firm* — Sand, Sebolt & Wernow Co., LPA

(57) ABSTRACT

A method for cross-bore risk management involves receiving at least one dataset comprising a plurality of assets and cross-bore data. A risk probability value is calculated, using a processor, based on the cross-bore data for each asset of the plurality of assets using machine learning techniques. The risk probability values are spatially distributed around each respective asset. A graphical output is produced that illustrates the risk probability for a specified geographical area based on the spatially distributed risk probability values.

20 Claims, 14 Drawing Sheets

Related U.S. Application Data

(60) Provisional application No. 62/818,456, filed on Mar. 14, 2019, provisional application No. 62/690,590, filed on Jun. 27, 2018.

(51) Int. Cl.
  *G06Q 10/0635* (2023.01)
  *G06T 11/60* (2006.01)
(58) Field of Classification Search
  USPC .......................................................... 705/7.28
  See application file for complete search history.

(56) References Cited

U.S. PATENT DOCUMENTS

| | | | |
|---|---|---|---|
| 8,988,969 B2 | 3/2015 | Wallbom et al. | |
| 9,183,524 B2 | 11/2015 | Close et al. | |
| 9,183,527 B1* | 11/2015 | Close | G06Q 50/06 |
| 9,219,886 B2* | 12/2015 | Sooy | E21B 47/002 |
| 9,534,490 B2 | 1/2017 | Farrag et al. | |
| 11,906,989 B2 | 2/2024 | Lendi | |
| 2011/0261649 A1* | 10/2011 | Wallbom | E21B 47/0224 367/81 |
| 2015/0154522 A1* | 6/2015 | Mircean | G06Q 50/08 705/7.28 |
| 2016/0103433 A1* | 4/2016 | Sahni | G06F 3/0484 700/83 |
| 2016/0104071 A1* | 4/2016 | Brueckner | G06N 7/01 706/52 |
| 2016/0283915 A1* | 9/2016 | Aggarwal | G06F 16/29 |
| 2016/0356666 A1 | 12/2016 | Bilal et al. | |
| 2018/0171774 A1* | 6/2018 | Ringer | E21B 47/002 |
| 2018/0349817 A1* | 12/2018 | Goel | G06F 30/13 |

FOREIGN PATENT DOCUMENTS

| | | | |
|---|---|---|---|
| CN | 101354757 B | * | 8/2010 |
| DE | 102023131403 | | 8/2024 |
| WO | 2014/142929 | | 9/2014 |
| WO | 2017/171734 | | 10/2017 |

OTHER PUBLICATIONS

Barrios, et al., "Using the Gravity Model to Estimate the Spatial Spread of Vector-Borne Diseases", International Journal of Environmental Research and Public Health, vol. 9, 2012, pp. 4346-4364.
Chen, "The Distance-Decay Function of Geographical Gravity Model: Power Law or Exponential Law?", Chaos, Solution & Fractals, vol. 77, Aug. 2015. pp. 174-189.
Kurowska, et al., "The Use of Gravity Model in Spatial Planning", Environmental Engineering 10th International Conference, Apr. 2017, 9 pages.
Mele, et al., "A Critique of the Gravitational Model in Estimating the Determinants of Trade Flows", International Journal of Business and Commerce, vol. 2, No. 1, Sep. 2012, pp. 13-23.
Nekola, et al., "The Distance Decay of Similarity in Biogeography and Ecology", Journal of Biogeography, vol. 26, No. 4, Jul. 1999, pp. 867-878.
Oliphant, et al., "Modeling Cross Bore Risk", 2017, 5 pages.
Taylor, Distance Decay in Spatial Interactions:, 1975, 19 pages.
Tony Sileo (moderator), "Risk Model for Cross-Boring," Slideplayer.com, 2016 [online] Retrieved on Sep. 9, 2024 from the Internet: <URL: slideplayer.com/slide/13176092/> (17 pages).
Shittu Whanda et al., "Modelling of Potential Pipeline Impact Radius and High Consequence Area in a Wetland Sub-Region of Nigeria," Journal of Geographic Information System, 2015, 7, 692-709 (published online Dec. 2015 in SciRes). Retrieved on Sep. 9, 2024 from the Internet: <URL: http://dx.doi.org/10.4236/jgis.2015.76056> (18 pages).
Javier Tejedor et al., "Machine Learning Methods for Pipeline Surveillance Systems Based on Distributed Acoustic Sensing: A Review," Journal of Applied Sciences 2017, 7, 841 (published online Aug. 16, 2017). Retrieved on Sep. 9, 2024 from the Internet: <URL: www.mdpi.com/2076-3417/7/8/841> (26 pages).
Bahareh Inanloo et al., "A decision aid GIS-based risk assessment and vulnerability analysis approach for transportation and pipeline networks," Safety Science 84 (2016) 57-66 (published online Apr. 2016). Retrieved on Sep. 9, 2024 from the Internet: <URL: www.sciencedirect.com/science/article/abs/pii/S0925753515003161> (11 pages).
Adewumi Rowland, "GIS-Based Prediction of Pipeline Third-Party Interference Using Hybrid Multivariate Statistical Analysis," PhD Thesis, School of Marine Science and Technology, Newcastle University Newcastle Upon Tyne (published online Dec. 2010). Retrieved on Sep. 9, 2024 from the Internet: <URL: theses.ncl.ac.uk/jspui/handle/10443/2529> (317 pages).
Lei Ma et al., "Quantitative risk analysis of urban natural gas pipeline networks using geographical information systems," Journal of Loss Prevention in the Process Industries, vol. 26, Issue 6 (published online Nov. 2013). Retrieved on Sep. 9, 2024 from the Internet: <URL: doi.org/10.1016/j.jlp.2013.05.001> (pp. 1183-1192).
Hassan Al-Barqawi, et al., "Condition Rating Model for Underground Infrastructure Sustainable Water Mains," Journal of Performance of Constructed Facilities, vol. 20, No. 2, May 2006 (published online May 1, 2006). Retrieved on Sep. 9, 2024 from the Internet: <URL: ascelibrary.org/doi/abs/10.1061/(ASCE)0887-3828(2006)20:2(126)> (11 pages).
U.S. Appl. No. 16/452,922 Letter from Sep. 11, 2024 having an attachment, which is a Sep. 10, 2024 letter from Third Party Counsel.
Oliphant, K. (May 21, 2015). Modeling Cross Bore Risk [Conference Presentation]. AGA 2015 Operations Conference &Biennial Exhibition, Grapevine, TX, United States.†
Azari, P., &Karimi, M. (2017). Quantitative Risk Mapping of Urban Gas Pipeline Networks Using GIS, ISPRS—International Archives of the Photogrammetry, Remote Sensing and Spatial Information Sciences, 319-324.†
D'Atri, M.F., Rodríguez, D., &García-Martínez, R. (2009). Improving Pipeline Risk Models by Using Data Mining Techniques. http://members.igu.org/html/wgc2009/papers/docs/wgcFinal00663.pdf.†

\* cited by examiner
† cited by third party

CROSS-BORE RISK ASSESSMENT AND RISK MANAGEMENT TOOL

RELATED PATENT DOCUMENTS

This application is a continuation application of U.S. patent application Ser. No. 16/452,922, filed on Jun. 26, 2019, which claims the benefit of Provisional Patent Application No. 62/960,590 filed on Jun. 27, 2018 and Provisional Patent Application No. 62/818,456 filed on Mar. 14, 2019 which are incorporated herein by reference in their entirety.

SUMMARY

Embodiments described herein involve a method for cross-bore risk management comprising receiving at least one dataset comprising a plurality of assets and cross-bore data. A risk probability value is calculated, using a processor, based on the cross-bore data for each asset of the plurality of assets using machine learning techniques. The risk probability values are spatially distributed around each respective asset. A graphical output is produced that illustrates the risk probability for a specified geographical area based on the spatially distributed risk probability values.

Embodiments described herein involve system for cross-bore management. The system includes a processor and a memory that stores computer program instructions which when executed by the processor cause the processor to perform operations. At least one dataset is received, the dataset comprising a plurality of assets and cross-bore data. A risk probability value is calculated based on the cross-bore data for each asset of the plurality of assets using machine learning techniques. The risk probability values are spatially distributed around each respective asset. A graphical output is produced that illustrates the risk probability for a specified geographical area based on the spatially distributed risk probability values.

Embodiments described herein involve a method for risk determination comprising receiving at least one dataset comprising a plurality of assets and risk data. A risk probability value is calculated, using a processor, based on the risk data for each asset of the plurality of assets using machine learning techniques. The risk probability values are spatially distributed around each respective asset. A graphical output is produced that illustrates the risk probability for a specified geographical area based on the spatially distributed risk probability values.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
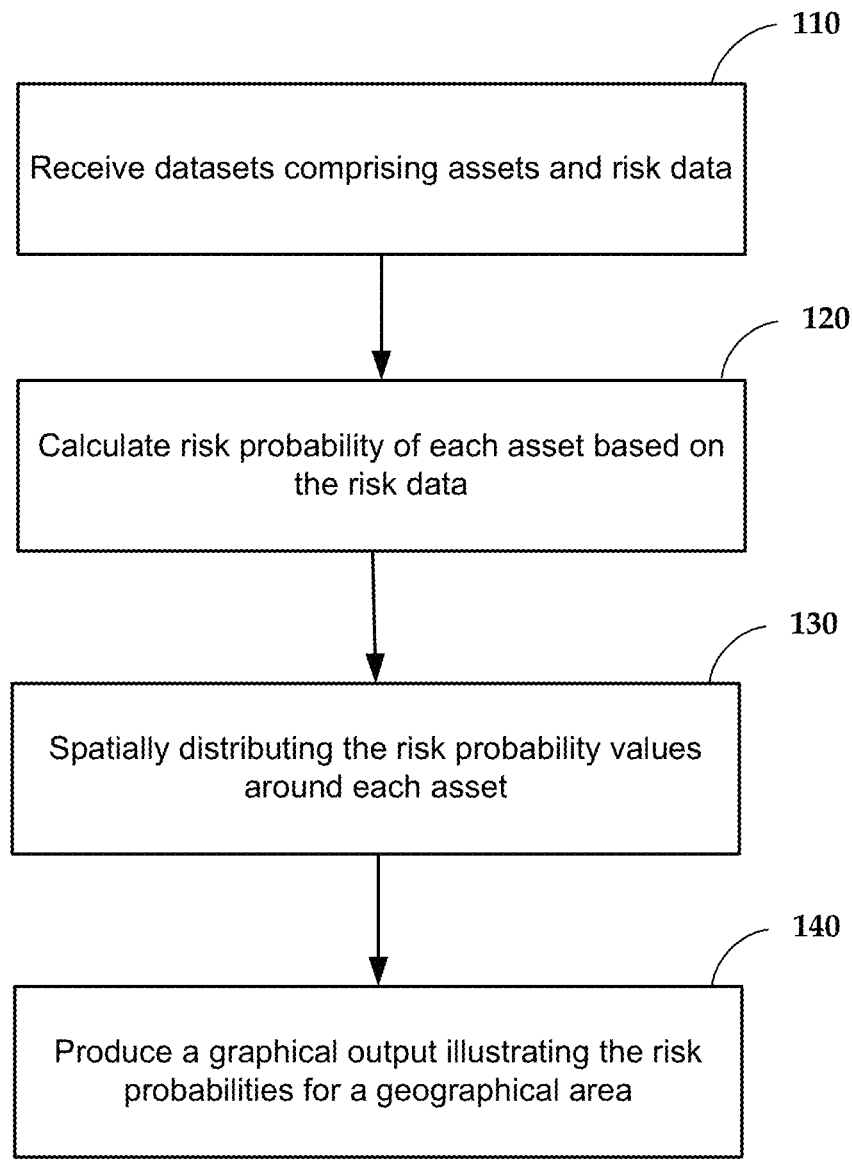
FIG. 1 illustrates a process for producing an output showing risk probabilities for a geographical area in accordance with embodiments described herein.

Much of the urban underground is laced with pipes, cables, and other linear features that crisscross at various depths. Many of these linear features are installed using a method called horizontal drilling (HDD) and as such the installing contractor is often "blind" to what conflicts might exist nor the potential damages associated with an unintentional intersection of the product being installed with other existing in situ features. Embodiments herein describe in great detail the use and application as it relates to natural gas distribution lines, but the system and methods employed are equally applicable to other subsurface products, e.g., gas, water, and/or electrical applications, but also any other "big data" scenarios where risk assessment and risk avoidance are of concern. For example, embodiments described herein may be applicable to risk assessment of other types of infrastructure such as bridges.

Trenchless methods of installing underground pipes and cables, such as horizontal boring and/or using percussive pneumatic tools, has significantly reduced costs and disruption to traffic and commerce. However, when these trenchless methods are employed, the contractor cannot see the pipe as it is being installed. In the congested subsurface landscape where any number of in-place pipes and cables are closely located, occasionally cross-bores happen. If the cross-bore happens at an intersection with another pipe that is under pressure it will quickly become evident and immediate remediation will take place. This is not so with gravity sewer pipes or home laterals that are open to atmosphere. In these instances, the cross-bore can go undetected until found by accident during a cleaning or inspection activity.

Natural gas lines installed by trenchless methods are generally made of a type of plastic that can be cut or otherwise damaged by third parties and/or mechanical means. If the cross-bore is at the intersection with a sewer lateral and the gas pipe becomes cut by a cleaning or televising operation, gas can quickly fill the sewer line, and the house to which it is attached. This can cause significant damage given the potential for a fire and/or explosion. It is estimated that tens of thousands of these cross-bores exist throughout the country and many gas utilities are now engaged in attempts to determine where these are within their networks so that they can be removed.

The current method for empirical verification that cross-bores do or do not exist uses apparatuses and methods that are invasive to home owners and to the utilities. This expense, without having a high confidence method of identifying which areas are most likely to have cross-bores, is ineffective and does little to ensure public safety beyond chance. To positively remove the dangers associated with cross-bores requires an accurate and timely inspection of sewer mains and laterals. Risk analysis for prioritization of areas most likely affected by cross-bores may reduce the danger to life and property.

Various models have been developed by utilities to standardize methodologies for area prioritization in order to reduce the degree of subjective selection that use query attribute tables in databases compiled from past inspections and a priori knowledge of asset attribute data. This data is typically made up of installation dates, installation methods, pipe diameters and pipe materials. These selected attributes are commonly used to create an index that has no underlying tangible value and is unable to be statistically tested for validity.

Therefore, in order to increase the cost effectiveness of carrying out such programs, and doing so with the greatest potential of removing this risk from a utilities system, embodiments described herein use the feature attributes and spatial information to produce a true probability, capable of calculating expectation values that can be statistically validated.

Embodiments described herein involve various means and methods for calculating the probabilities of subsurface events, such as "cross-bores," within an entire population of assets occurring in any given geographical area. A cross-bore is defined as an intersection of one utility intersecting with another utility. The embodiments described herein are based on a group of advanced algorithms and the application of well accepted statistical methodologies. The event history is used for a set of inspected assets to extrapolate risk probabilities onto the entire population of assets.

Quantitative risk analysis, provided by embodiments described herein, provides individuals in charge of the risk management process with objectively derived analysis concerning the likelihood and location of risk events. The results of this assessment are then used to prioritize risks to establish a most-to-least-critical importance ranking through various analytical means. Ranking risks in terms of the areas of likely occurrence of cross-bores within a system provides insights to the project's management on where resources may be needed to manage or mitigate the realization of high probability and/or high consequence risk events within a complex project.

Unique to embodiments described herein is the predictive analysis of uncertainty which is juxtaposed to the prediction of risk, where risk is the probability of an unfavorable event occurring, and where predictive analysis of uncertainty is the indefiniteness about the outcome of a situation. Predictive analysis of uncertainty, along with objectively derived risk analysis through the application of rigorous mathematical procedures, not found in subjective tabular analysis typically employed by utilities, forms the basis for embodiments described herein. This is a material departure from the practice of subjective probability assessments, with no method to quantify uncertainty, even by individuals having expert technical judgement, that cannot compare to objectively derived probabilities from applicable axioms and theorems.

It is possible to return meaningful results, regarding the predictive accuracy of cross-bore locations, even when the number of previously located cross-bores are limited. However, as subsequent locations of cross-bores are identified and added to the dataset, the predictive power of this model increases significantly. This further validates the model's ability to be more likely to predict subsequent cross-bore events approaching the inherent accuracy of the dataset over time. Said another way, more is better, but with only a few cross-bores as a starting point, the model adapts to the uncertainty of the data, and provides a better result for the specific network due to the machine learning aspects of the spatial analytics inherent in the model.

The spatial density and distribution of subsurface linear features, and orthogonal vectors of maximum variance, through linear regression, translate into independent component probabilities in vector space allowing for a graphical output or heat map. Computational algorithms used in embodiments described herein, like other machine learning methods and artificial neural networks, form systems that continually evaluate parameters of risk against historical data. This recursive data analysis provides building blocks to create the output in a graphical or tabular output.

A comprehensive risk identification and mitigation program accounts for the risk at a location from multiple assets. Traditional methods of spatial distribution aim to associate areas with a percentage of a risk value which can produce inaccurate representations of risk in a cumulative fashion. Embodiments described herein distribute the risk values in such a way that overall numerical integrity is maintained through a physical field analogy.

The spatial embodiments of this disclosure are used to disperse the event probabilities into a three-dimensional physical space around the asset using the attributes as predictors. The role of this model according to various embodiments is to distribute the value over an area such that summation of the area equals the magnitude of the original value.

Embodiments of the disclosure are directed to a computer-implemented method for determining the set of predicted outcome variables defined on a set of physical assets given a set of verified outcomes (events) and a complete set of associated multidimensional covariate data (attributes) that spans the population of all data variables and metadata defined on the set of assets. According to embodiments described herein, verified outcomes and/or events may correspond to an outcome variable with a known value that has been sampled and/or measured as determined by direct inspection and a predicted outcome variable corresponds to an outcome variable that is predicted by statistical inference. According to some embodiments, the geographic information system (GIS) assets, comprising verified outcomes, covariate data and metadata comprised of geo-locations, digital images, asset identifiers and timestamps are retrieved from a plurality of data storage units: According to embodiments described herein a covariate and/or attribute correspond to a categorical or continuous variable that is predictive of the outcome variable of interest.

Embodiments of the disclosure are directed to a method and system for assessing probabilistic events through orthogonalization of categorical or continuous measured or detected features. Asset specific event probabilities are spatially distributed using a network-defined field function and then aggregated. The network-defined function is dependent on the unique set of asset probability and spatial distributions for each dataset.

Embodiments of the disclosure provide for both the calculation of a probability value through statistical inference using orthogonalized quadrature of covariates and the spatial distribution of a numerical values via potential field analogy, whether used in conjunction with each other or independently. Given a set of events and corresponding set of attributes that are potentially predictive of said events on a subset of spatial assets, a potential field analogy from natural physics is used to define a probability flux and probability field for the purpose of statistical inference on the network of assets to predict the probability of events and the spatial influence of the predicted event effects. According to embodiments described herein, spatial assets correspond to delineable objects and/or occurrences with known geometric definitions, physical locations, and/or attribute data.

Embodiments are directed to solving the problem of assigning a 3D spatial distribution of anomalous events given a subset of known events and corresponding attributes that are predictive of the event. Traditionally, spatial values are assigned manually based on past experience and statistics or by smoothing functions which focus on spatial autocorrelation instead of dispersion into a physical volumetric space. Embodiments of the disclosure project event probabilities into a three-dimensional field based on statistics collected from linear features. Although the linear to three-dimensional version is presented herein, embodiments are also applicable to any field analogy-based transformation between two vector spaces whether the spaces are of higher or lower dimensionality such as points and polygons.

FIG. 1 illustrates a process for producing an output showing risk probabilities for a geographical area in accordance with embodiments described herein. Datasets comprising a plurality of assets and risk data are received 110. According to various configurations, the risk data comprises cross-bore data. A risk probability value of each asset is calculated 120 based on the risk. According to embodiments described herein, the risk probability value is calculated using orthogonalized quadrature.

The risk probabilities are spatially distributed 130 around each asset. According to embodiments described herein, spatially distributing the risk probability values comprises calculating field values at locations radially away. In some cases, spatially distributing the risk probability values comprises calculating field values around line segments. According to various implementations, calculating field values around line segments comprises distributing probability value perpendicularly along the length of the segment and radially from the end vertices using a field equation.

A graphical output that illustrates the risk probabilities for a specified geographical area is produced 140. According to embodiments described herein, producing the graphical output comprises generating a raster image based on the spatially distributed risk probability values. Contour lines of cumulative risk density may be produced using the raster image. In some cases, polygons are generated using the contour lines. Work may be prioritized based on the polygons. The graphical output may be any time of graphical output. For example, the graphical output may be a heat map.

Figure 2:
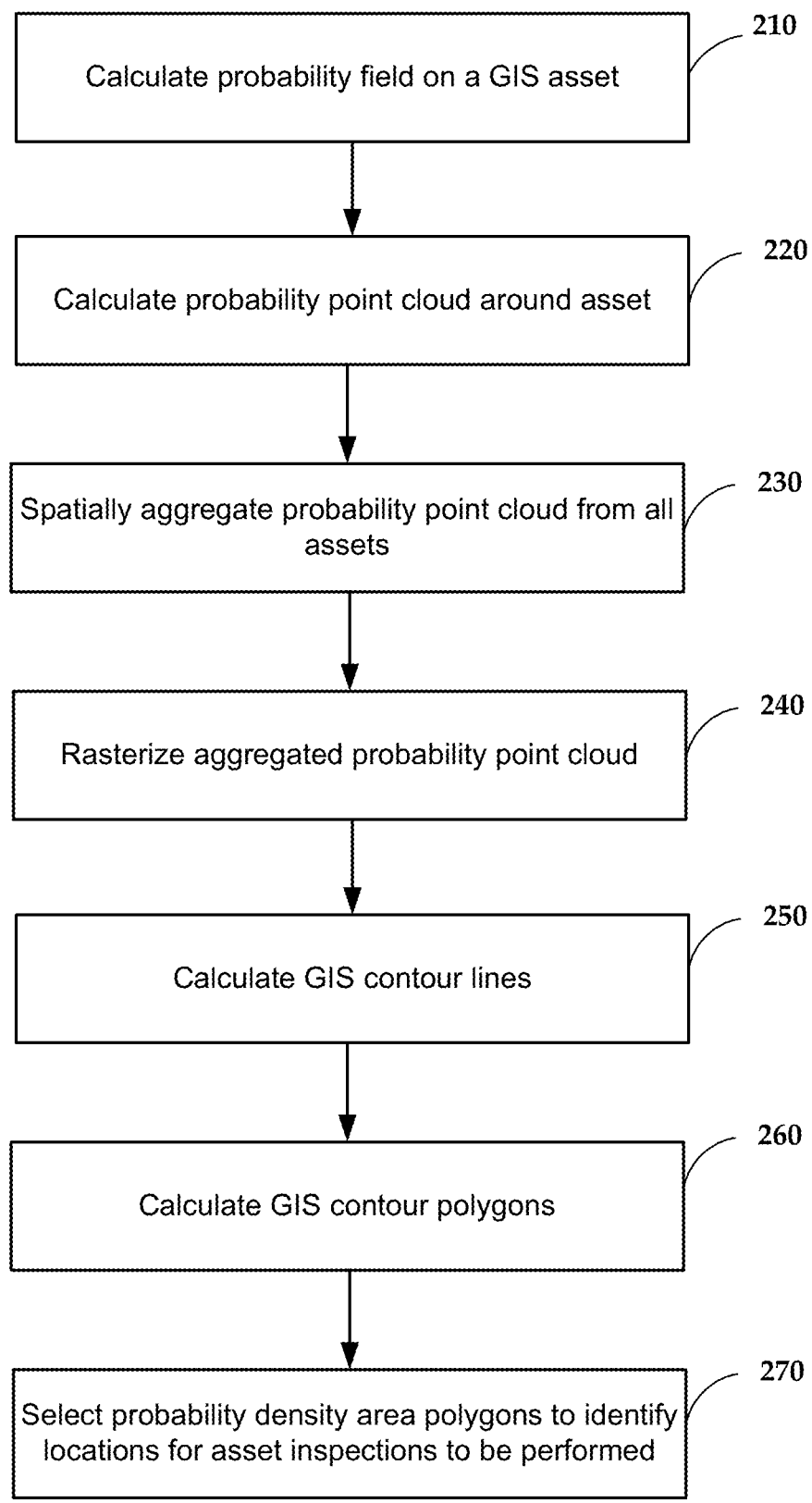
FIG. 2 illustrates a more detailed process for producing an output showing risk probabilities for a geographical area in accordance with embodiments described herein.

FIG. 2 illustrates a more detailed process for producing an output showing risk probabilities for a geographical area in accordance with embodiments described herein. A probability field on a GIS asset is calculated 210. A probability point cloud around each asset is calculated 220. The point cloud is a set of points surrounding each asset that samples the magnitude of the risk field. The probability point cloud is spatially aggregated 230 from all assets. The aggregated probability point cloud is rasterized 240. GIS contour lines are calculated 250. Using the GIS contour lines, GIS polygons are calculated 260. Probability density area polygons are selected 270 to identify locations for asset inspections to be performed.

While much of this disclosure is directed to risk assessment in the utility and/or natural gas industry, it is to be understood that the methods and devices described herein can be used in any type of application that could benefit from risk assessment and management. In this implementation example, a probability model for cross-bores is calculated for uninspected natural gas distribution networks. The process flow is shown in FIGS. 3-6. The assets are gas pipeline segments that are specified by the customer. The verified outcomes (event data) for this application are cross-bores previously identified by inspection, obtained from querying a computer database populated from the results of closed-circuit TV (CCTV) inspection of sewer mains and laterals. The set of attributes (covariates) comprise the installation dates, installation methods, pipe material, measured pipe length, and pipe diameter, along with associated metadata comprising geo-locations of assets in the customer-specified map projection, time-stamps, and customer-specified asset identification codes. Previously identified cross-bore data is collected along with the corresponding attribute data. A set of probabilities is determined for each asset corresponding to each attribute through classification, regression, or discretized classification methods. The attribute probability data is organized into column vectors for each asset. The vectors are assembled into a matrix where each row is indexed to an asset. The covariance matrix calculated from this matrix, an Eigen-decomposition is used to orthogonalize the attribute probabilities. Computing the Euclidean norm of the transformed probabilities yields the scalar probability for each asset, as shown in the last step in FIG. 3.

Figure 3:
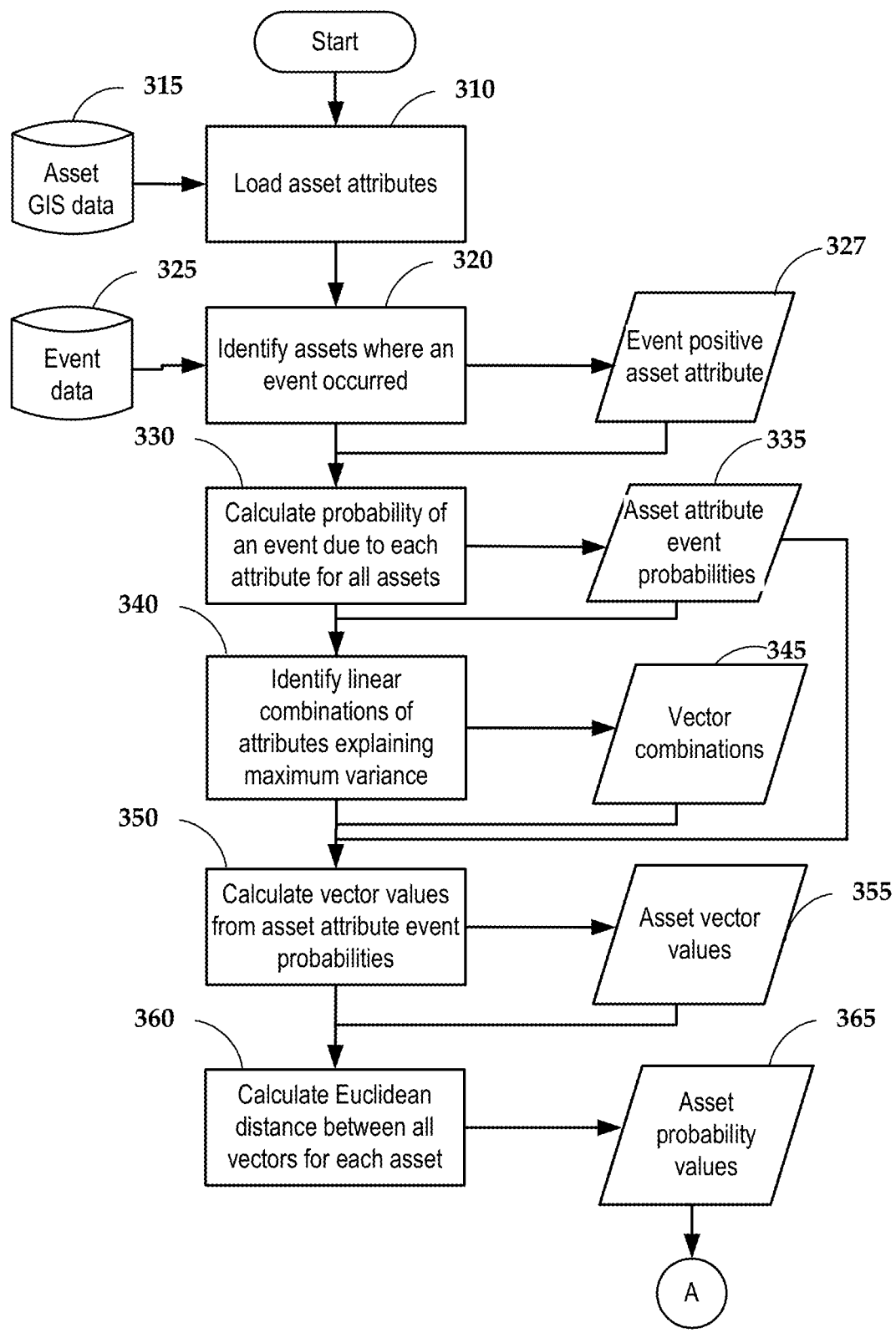
FIG. 3 shows a more detailed process for calculating risk probability values in accordance with embodiments described herein.

FIG. 3 shows a more detailed process for calculating risk probability values in accordance with embodiments described herein. Attributes for a plurality of assets are loaded 310 from a database 315. According to embodiments described herein, the data is received from the database 315 in a tabular format. For example, the received data format may include a comma-separated value (CSV) format, and/or a GIS file format. The tabular format may be built and/or received from one source or multiple sources. The data received from the database 315 spans the entire dataset to be assessed and may include various types of information. For example, one or more of records with known events, records to be used for training, additional attributes, and spatial information about the assets and/or events. According to various embodiments, the data set requirements are verified. This may be done by identifying specific columns to be used in calculating risk. This step checks the existence, uniqueness, and nullability of these columns to ensure that all of the needed columns are present and that each column is unique and not null for each record. The types of events are classified. For example, the events may be classified between regression, binary, and/or classification. A machine learning engine can apply to more than just this model. This step identifies which type of machine learning algorithm to use. The risk model is one of these types. The other types may not be used to implement the risk model. Eventually they may be used to improve the data set by predicting missing values.

Assets where an event occurred are identified 320 based on data stored in an event database 325. The identified event positive asset attributes 327 are used to calculate 330 a probability of an event due to each attribute for all assets. According to embodiments described herein, the probability is calculated using orthogonalized quadrature. Metadata may be inferred about features, such as text and numbers, to ensure that the system is able to process the dataset with like metadata, i.e., pipe size is a numeric value and pipe material is a text value. Missing values can be predicted based on the metadata. The features are transformed into probabilities by categorizing strings of low-density numeric features. In the event that there is high data sparsity, high density numeric features are regressed. If there is low data sparsity, high density numeric features are discretized. Eigen vectors and values are calculated. Feature probabilities are orthogonalized through matrix multiplication with Eigen vectors and values. The asset probabilities are condensed through quadrature. The discretization function bins continuous values into classes to be used in categorization. A cross entropy based algorithm is used to determine the bin delineations.

According to embodiments described herein, the probability is calculated and/or verified using machine learning. In some cases, the asset probabilities are calculated using more than one machine learning model. For this example, the root mean square error is calculated for each model. This may be used to determine the best model by selecting the lowest value by root mean square error. The result may be used to exclude one or more models that are more than one order of magnitude worse than the best model. The remaining models probabilities may be averaged to determine the asset probability.

The calculated asset attribute event probabilities 335 are used to identify 340 linear combinations of attributes explaining maximum vectors (variance). The vector combinations 340 are used to calculate 350 vector values from asset attribute event probabilities. The asset vector values 355 are used to calculate 360 Euclidean distance between all vectors for each asset to create the asset probability values 365.

According to embodiments described herein, event occurrence can be predicted within a population. This can be done in addition to or as an alternative to calculating probabilities. An F1 score is calculated for each model. Models with an F1 score below a predetermined threshold may be excluded. A voting mechanic may be used to aggregate event predictions at the asset level. The majority of the model's outputs dictates the combined output value per asset.

Figure 4:
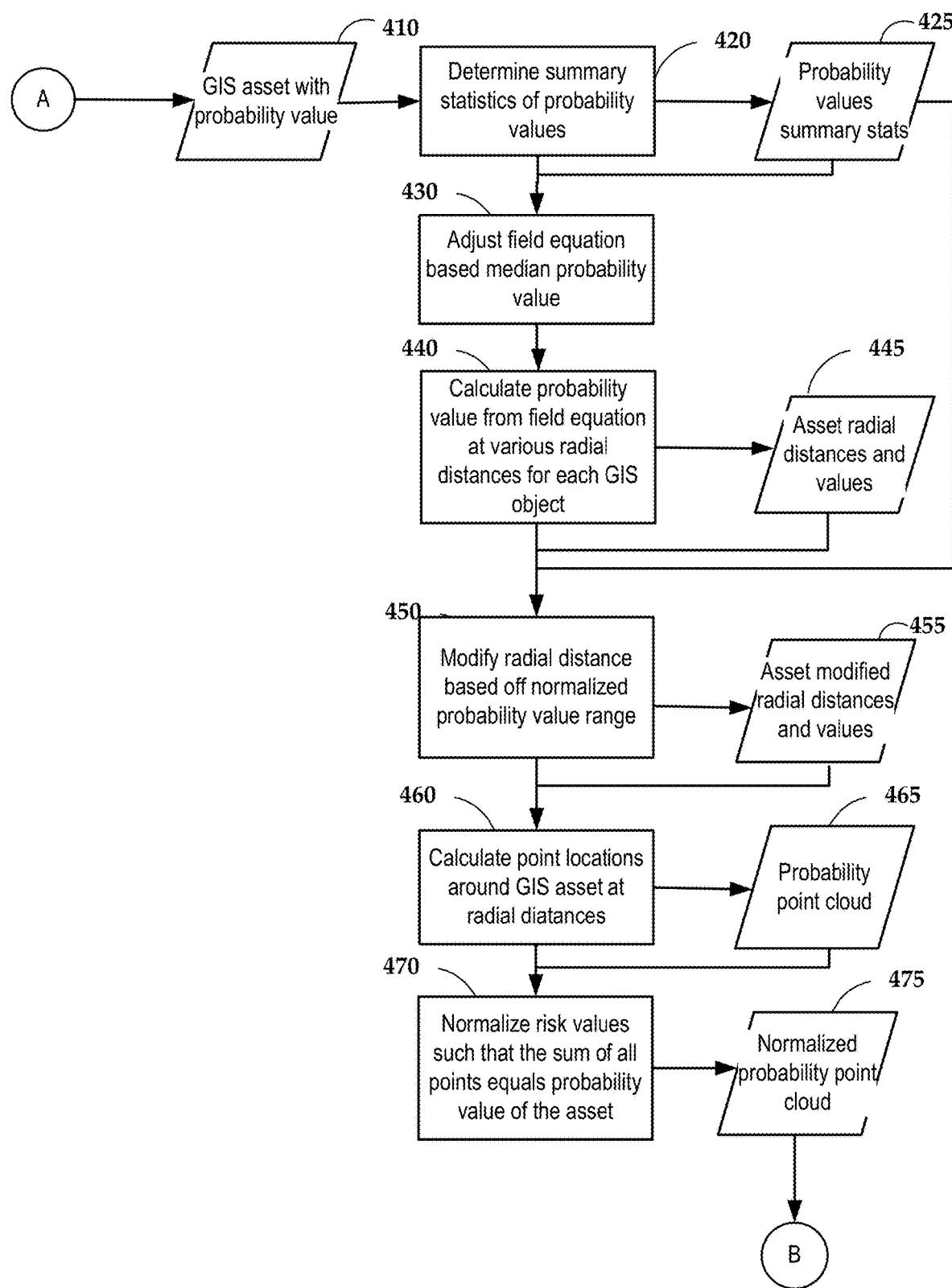
FIG. 4 shows a more detailed process for spatially distributing the computed probability values for each asset and creating a probability point cloud in accordance with embodiments described herein.

FIG. 4 shows a more detailed process for spatially distributing the computed probability values for each asset and creating a probability point cloud in accordance with embodiments described herein. The asset probability values 410 calculated in FIG. 3 are used to determine 420 summary statistics of probability values. According to embodiments described herein, a spatial asset type is determined. For example, it may be determined that a spatial asset type is line, a point, and/or a polygon spatial feature type. This is done by inspecting the value of the coordinates per asset. Scaling coefficients may be determined. This is done by analyzing the network density of the spatial assets as well as the probability distribution within the network.

The probability values summary statistics 425 are used to adjust 430 a field equation based on a median probability value. A probability value is calculated 440 from a field equation at various radial distances for each GIS object. This is done by surface integration of the curvilinear space defined radially around the asset. A point cloud is created by distributing values around each asset using the field equation. This may be done differently depending on whether the asset is a point spatial type or a line spatial type. In the case of a point spatial type, the field values may be calculated at locations radially away.

If the asset is a line spatial type field values are calculated around line segments. This may be done by decimating lines with more vertices than a threshold value, keeping first and last vertices (increases performance around curved lines). The lines are broken into segments and the probabilities are scaled as a ratio of total line length. A hyperparameter scaling value is used to adjust the median range of influence of the network and is applied to each segment. In practice, the segments are defined by the customer provided spatial object definitions. For each line segment, the maximum and minimum radius of the point cloud by the aggregation scale is calculated making sure that there is adequate coverage of all nearby raster/heat map cells. For each segment, supersample segment at the minimum radius and distribute probability value perpendicularly along the length of the segment and radially from the end vertices using the field equation. In the event that the asset is a polygon spatial type, the field values are calculated in and around the polygon.

Figure 5:
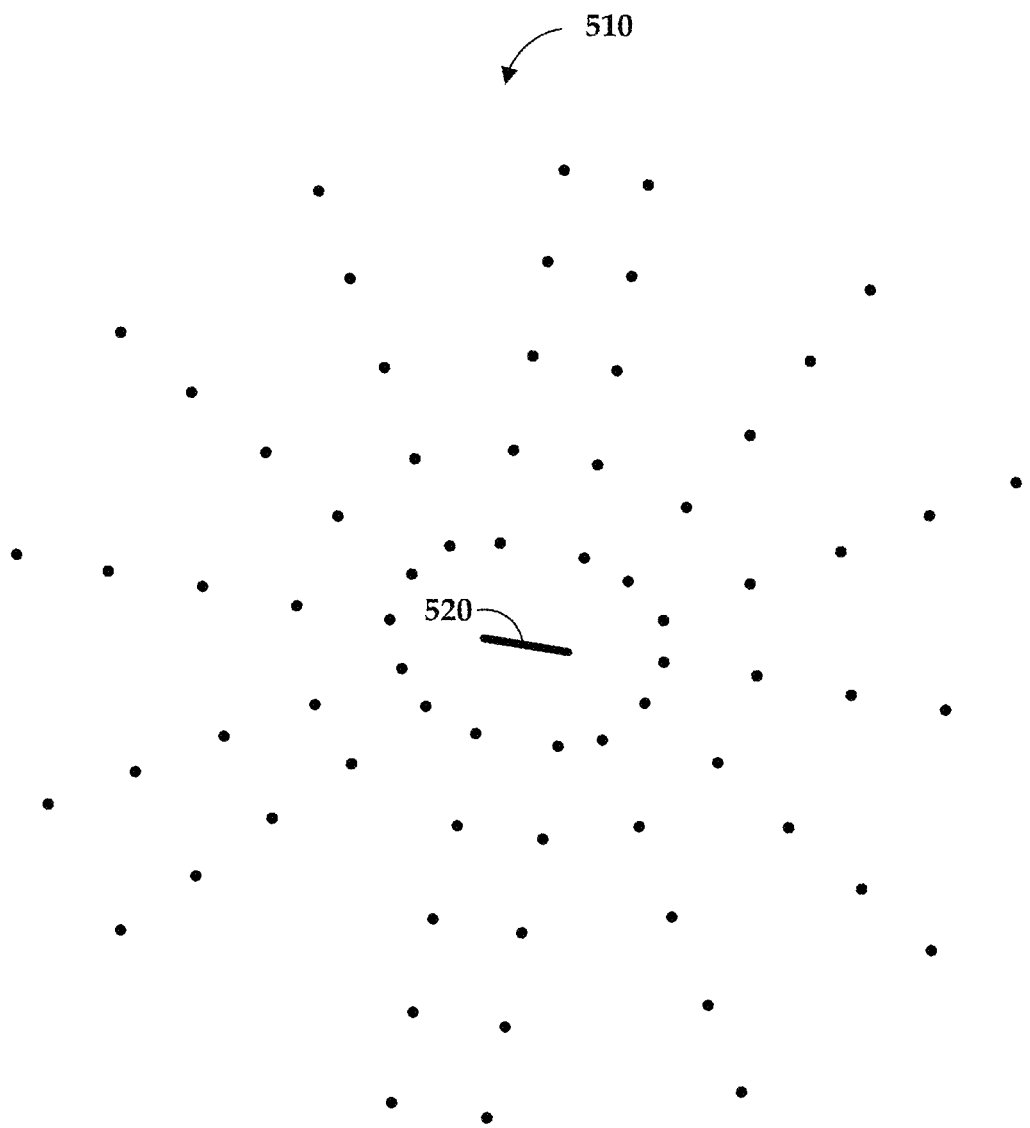
FIG. 5 illustrates a point cloud around an asset segment in accordance with embodiments described herein.

The fields from all the segments are spatially superimposed by addition and scale adjustments of the hyperparameter are applied as needed to yield the probability flux density field over the area of interest. The asset radial distances 445 are used to modify 450 a radial distance based off a normalized probability value range. The modified radial distances 455 are used to calculate 460 point cloud locations around the GIS asset at radial distances. The resulting probability point cloud 465 is used to normalize the risk values such that the sum of all points substantially equals the probability value of the asset to create a normalized point cloud 475. The field is sampled by a point cloud 510 surrounding each asset segment 520, as shown in FIG. 5. The values of probability at the point cloud samples are adjusted such that the sum of the points equals the probability value for the associated asset.

Figure 6:
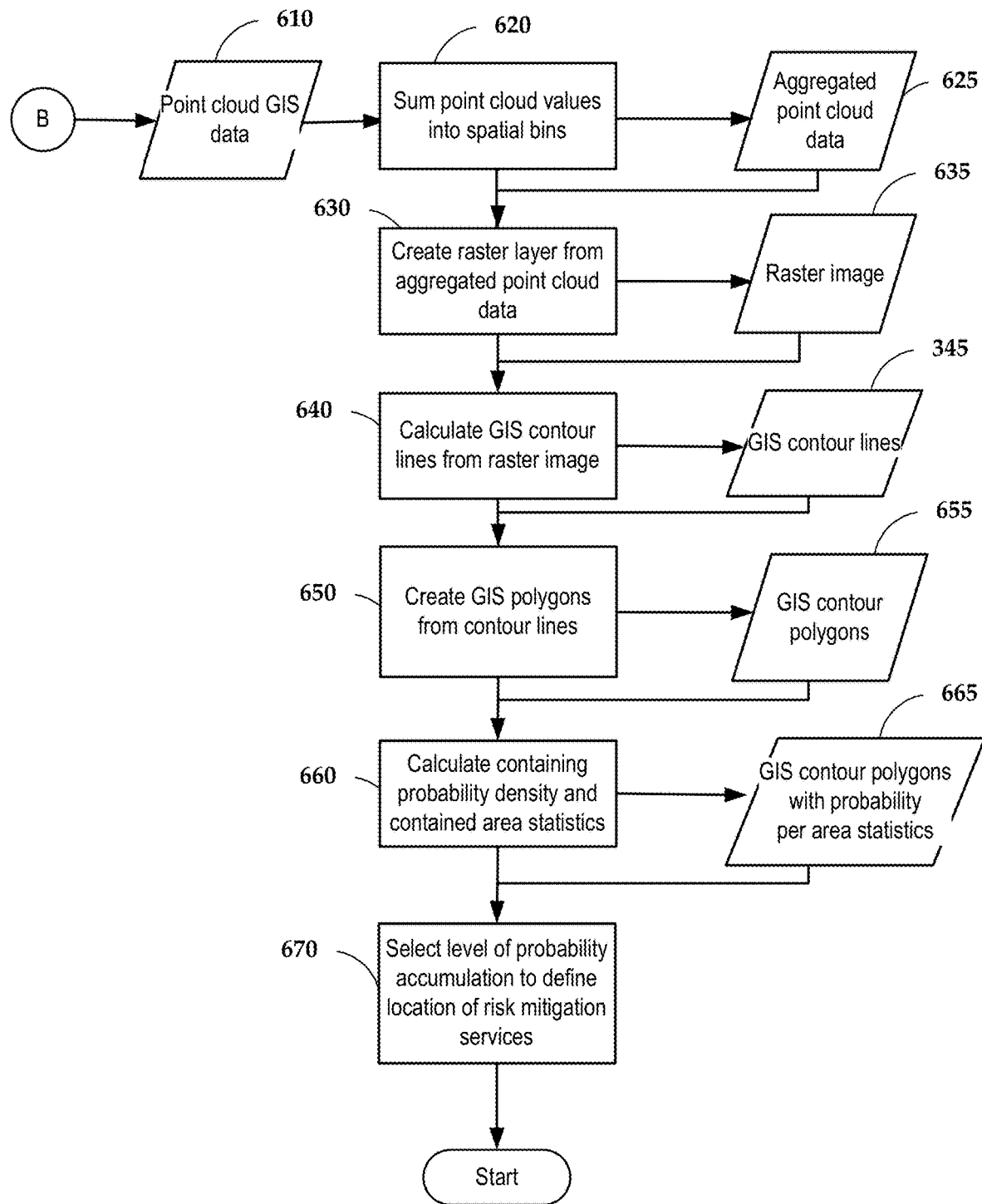
FIG. 6 illustrates a more detailed process for producing a graphical output that illustrates the risk probabilities for a specified geographical area in accordance with embodiments described herein.

FIG. 6 illustrates a more detailed process for producing a graphical output that illustrates the risk probabilities for a specified geographical area in accordance with embodiments described herein. The point cloud of GIS data 610 is used to sum 620 the point cloud values into bins to create aggregated point cloud data 625. The aggregated point cloud data 625 is used to create 630 a raster image. Next, the point cloud values are aggregated into raster cells. According to embodiments described herein, the point coordinates are determined by rounding to the nearest raster cell size factor. This aligns all of the points in a cell at the same location. Points are grouped by location and sum values to build the heat map.

The resulting raster image 635 is used to calculate 640 GIS contour lines 645. This is done by identifying the cumulative decile range values, i.e., the first decile is the raster cell value where the sum of all raster cells with an equal or greater value is equivalent to the ten percent of the total sum of all raster cells. These values will be used to interpolate contour lines. The 10 decile values may be used to build contour lines of cumulative risk density. The area percentage can be calculated for each contour line providing a ratio of cumulative to cumulative area density.

The GIS contour lines 645 are used to create 650 GIS polygons 655. These polygons can optionally be selected by the client to prioritize work areas based off risk density in a given geographic region. The GIS polygons are used to calculate 660 a probability density and contained area statistics. 665. A level of probability accumulation to define a location of risk mitigation services is selected 670. The steps described in conjunction with FIGS. 2-6 illustrate an example processes for risk evaluation. It is to be understood that one or more of the steps listed may be optional.

Figure 7:
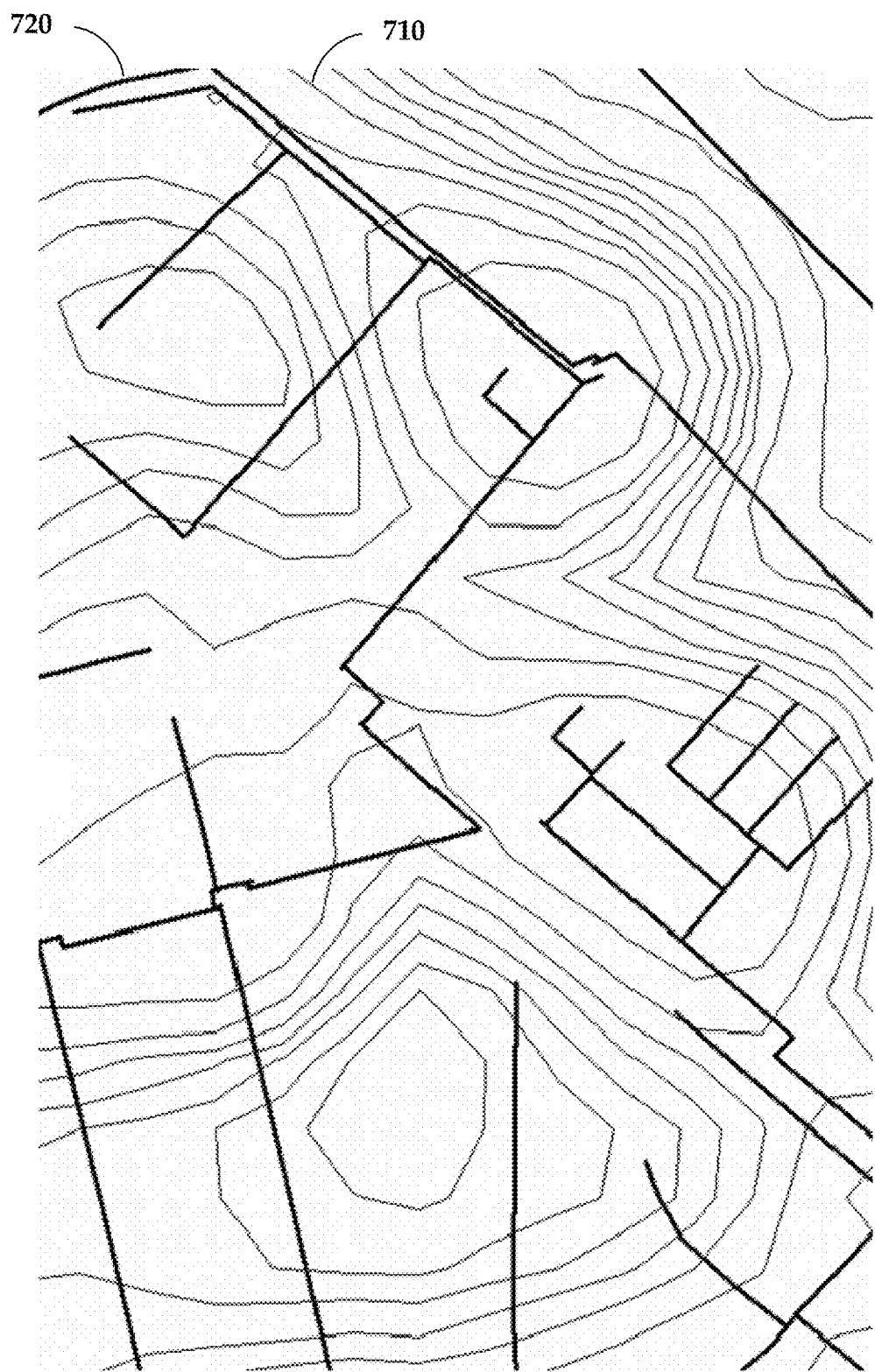
FIG. 7 shows an example of the contours with the asset layer displayed in accordance with embodiments described herein.

FIG. 7 shows an example of the contours 710 with the asset layer 720 displayed in accordance with embodiments described herein. The contours 710 are polygonized to spatially discretize the probability density values and associate the values with the assets. The final product is the probability of cross-bores occurring for each of entire set of uninspected assets and an areal selection of high-risk areas, which is used by the customer for risk mitigation, prioritizing inspection schedules and driving the decision process in an asset management program.

Figure 8A:
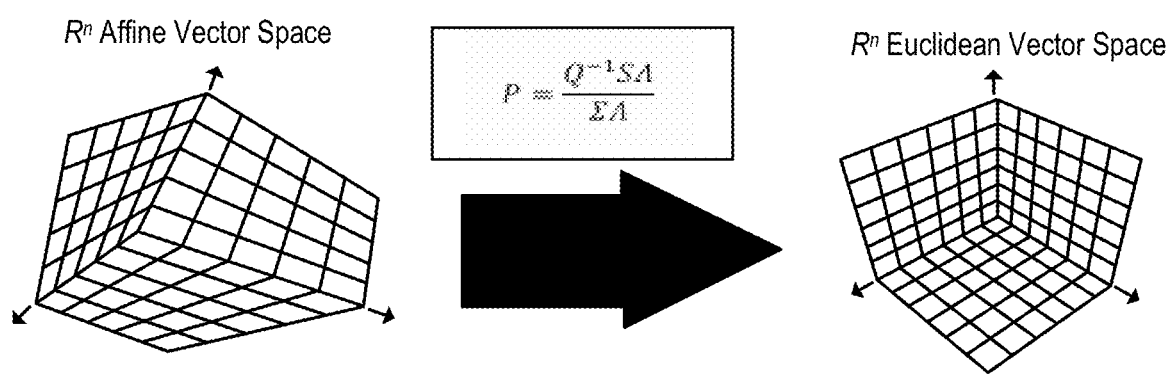
FIG. 8A illustrates an orthogonal probability matrix where the rows span the set of physical assets and the columns span the set of covariates in accordance with embodiments described herein.
Figure 8B:
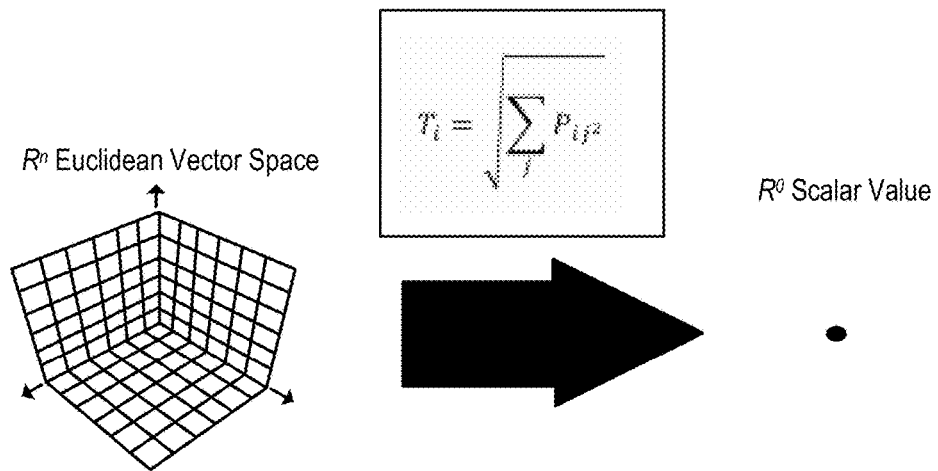
FIG. 8B shows the scalar probability of an outcome for each of the physical assets is determined by computing the Euclidean distance of the transformed orthogonalized covariate probabilities for each column corresponding to each physical asset for the set of all physical assets in accordance with embodiments described herein.

The subset of covariate data associated with the verified outcome variables in an affine N-dimensional vector space is orthogonalized to the N-dimensional Euclidean vector space by Eigen-decomposition of the covariance matrix of the covariates, yielding the orthogonal probability matrix where the rows span the set of physical assets and the columns span the set of covariates (FIG. 8A). The scalar probability of an outcome for each of the physical assets is determined by computing the Euclidean norm of the transformed orthogonalized covariate probabilities for each column corresponding to each physical asset for the set of all physical assets (FIG. 8B). With all physical assets assigned a probability value, the probabilities are spatially distributed along the extents of the physical assets by defining three-dimensional curvilinear vector spaces along the assets with a globally adjustable hyperparameter scale factor.

Figure 8C:
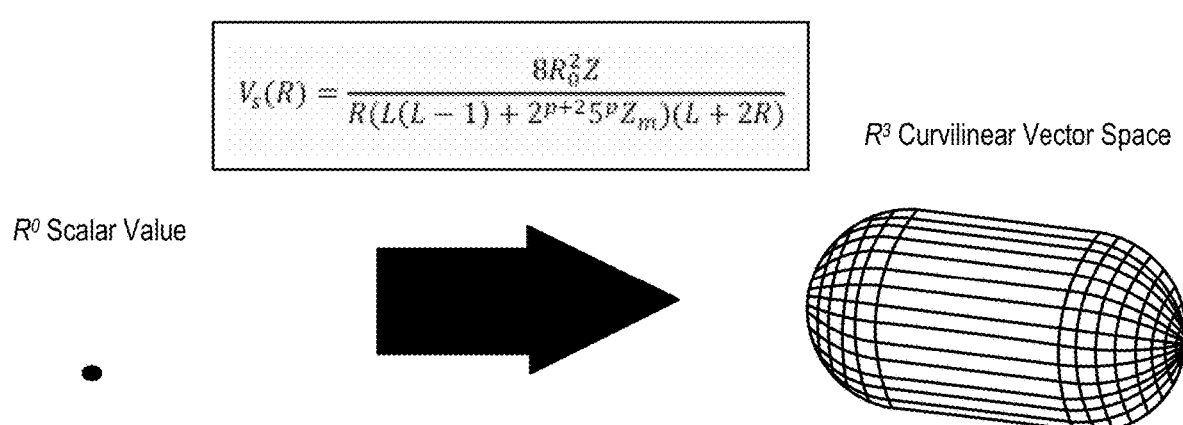
FIG. 8C shows that the surface integral can be converted to a contour integral by application of Gauss' Theorem in accordance with embodiments described herein.

The risk is spatially distributed into the three-dimensional curvilinear space as a risk field calculated by integration of the risk density through a closed surface surrounding each asset, yielding the risk flux density. According to embodiments described herein, the risk field is a three-dimensional set of continuous real values (e.g., within a range of values) defining the probability of an event. The surface integral can be converted to a contour integral by application of Gauss' Theorem (FIG. 8C). The contour integral includes a kernel density function that allows for non-linear adjustments of the field gradient, which is typically the entirety of common spatial kernel distributions, as an additional mechanism for modelling non-uniform and asymmetric fields such as vector fields. Setting the kernel density function to unity yields an inverse power of two distance decay. Other inverse power values or exponential decay values can be achieved by adjusting the kernel density function. In these cases, the integral may be evaluated numerically when no closed form is available.

In practice, the risk field is discretized by defining a set of sample point locations (point cloud) in the vicinity of each asset, where the density of the point cloud depends on the flux density magnitude. The individual point clouds are superimposed and aggregated for all assets and rasterized for GIS input. Further processing yield GIS contour lines and contour polygons which are delivered to the customer for use in customer business practices and asset management programs.

EXAMPLE

First Step: Client Provides Asset and Cross-Bore Data in One of Two Formats

1. Gas main and service GIS layers, gas cross-bore details, and inspected locations 2. A population data set in a csv or spatial file with metadata The model uses the input data in a specific format which allows the model to perform machine learning. The raw data can be transformed into this format or it can be provided directly from the client. The model requires a unique identification, identification if the asset has been inspected, identification if the asset has a known cross-bore, spatial information, and any number of additional feature attributes.

Figure 9A:
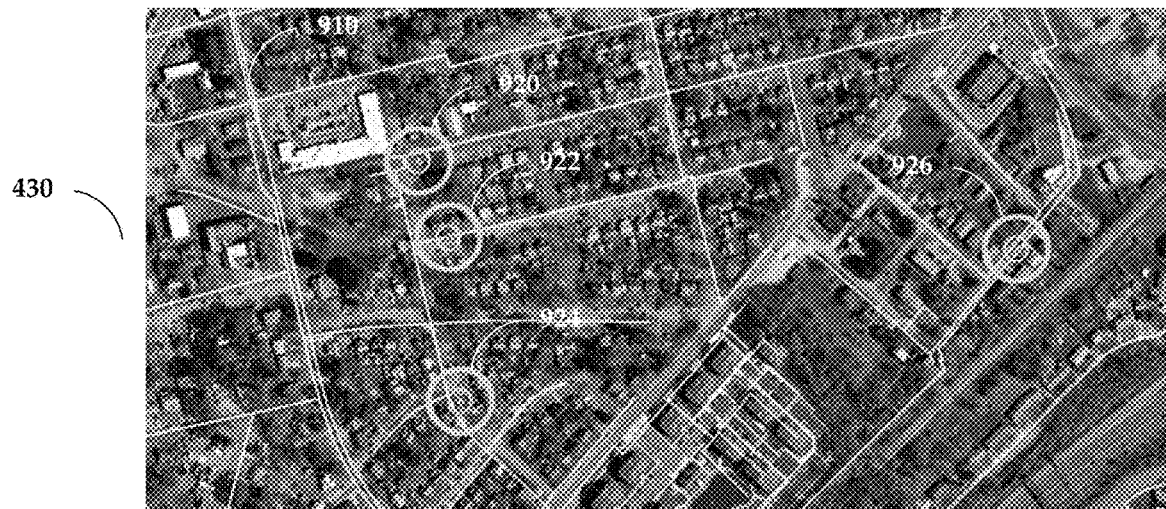
FIG. 9A illustrates an example image of a gas main layer and identified cross-bores in accordance with embodiments described herein.

The model uses various machine learning methods to extract out any inherit relationships between the attribute features and the known cross-bores for the inspected assets. This adaptive nature means the model will use any available data and does not require any specific features. This is a fault tolerant mechanism designed to extract the maximum amount of value from a client's data. FIG. 9A illustrates an example image of a gas main layer 910 and identified cross-bores 920, 922, 924, 926 in accordance with embodiments described herein.

Second Step: Calculate a Probability Value Per Asset

This step utilizes machine learning to produce a single probability value per each gas line, including both the inspected and uninspected lines. This value is an expectation value meaning it is theoretically possible to have a value greater than one to represent multiple cross-bores found in a single line which has been observed in the field. By calculating the probability for inspected lines, it is possible to estimate the level of risk already mitigated by existing programs.

Figure 9B:
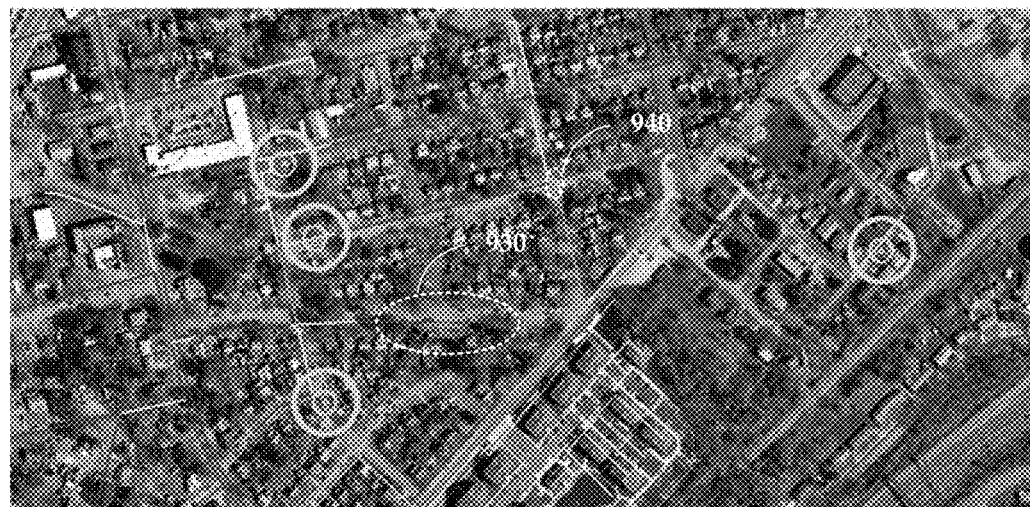
FIG. 9B shows an example area of low risk probability and an example area having high risk probability in accordance with embodiments described herein.

The model also performs the same level of uncertainty analysis on the provided data set as used in modern particle physics and incorporates the uncertainty in the output probabilities. Using the probabilities, an aggregate expectation score for the network can be calculated providing an estimated count of cross-bores with an uncertainty range. These values can be used to group and color code gas line segments by risk severity thresholds. FIG. 9B shows an image of an example area of low risk probability 940 and an example area having high risk probability 930 in accordance with embodiments described herein.

Third Step: Distribute the Probability Values Spatially Around the Assets

Figure 9C:
FIG. 9C illustrates probability values distributed into the space around the lines in accordance with embodiments described herein.

In order to address the physical location of the assets, the probability values are distributed into the space around the lines as shown in the example image of FIG. 9C. This step is used in a cross-bore analysis as it addresses the risk at a given location from multiple gas lines. Further, many high-risk lines are longer in length. The risk for foot is often much higher in shorter lines. By distributing the risk into the area surrounding the lines, the risk density reflects both the number of gas lines and the magnitude of their risk for unit length.

Common methods for generating heat maps utilize auto-correlation to produce relative values. This has the consequence of distorting the true value of the data. An algorithm designed to maintain the absolute values through the use a field equation is used. This equation transforms scalar values into a three dimension field by defining the space around a given assets and is applicable to any geometry type. A sampling method of selectable resolutions is used to implement this algorithm as a point cloud.

This method is a spatial machine learning algorithm as it adapts to the individual topology of the network. This has the advantage of identifying locations of greatest information density for the specific network and probability distribution. As the probability distribution or network topology changes, the model adapts to provide more accurate results.

Fourth Step: Generate a Raster of the Aggregated Probability Densities

The distributed probability values are converted into a raster image. It is not uncommon to have billions of points generated for a given network which need to be aggregated to provide usable results. This algorithm sums the point cloud probability values to produce a single risk value per raster cell. The sum of all raster cells equals the sum of all gas line probabilities within an error tolerance.

Figure 9D:
FIG. 9D shows an example heat map in accordance with embodiments described herein.

The advantage of an absolute raster allows for predictions and statistical validation. The aggregate probability value of an area is the expected chance of finding a cross-bore in that cell. These values allow for easier identification of high-risk areas with predictable outcomes. The gas main probability values, as determined by machine learning methods, and the spatial shape of the network determine the overall probabilities at any given location. Using this combination of methods has yielded high statistically significance with less than one percent of the assets inspected and fewer than twenty cross-bores found. FIG. 9D shows an example image of a heat map in accordance with embodiments described herein.

Fifth Step: Delivers Asset and Raster Probability Values for Use in Work Planning This model produces an objectively verifiable data set of probabilities for individual assets and areas. These probabilities are not an asset management system, but are intended to be used in a work prioritization program. There are additional considerations such as cost and accessibility which should be considered when selecting work areas and assets to inspect. These other considerations are inherently subjective and various methods can be implemented.

The machine learning algorithm has the benefit of outputting information about the data set as a side product. This information can be combined to provide insight into which factors contribute the cross-bore risk probabilities. As the model learns with subsequent inspections, these values are expected to evolve and could be used to modify prevention procedure for reduced risk of generating cross-bores.

Figure 10A:
FIG. 10A illustrates an image of contour lines calculated from the heat map gradient in accordance with embodiments described herein.
Figure 10B:
FIG. 10B shows closing the contour lines at a given value to form polygons in accordance with embodiments described herein.
Figure 10C:
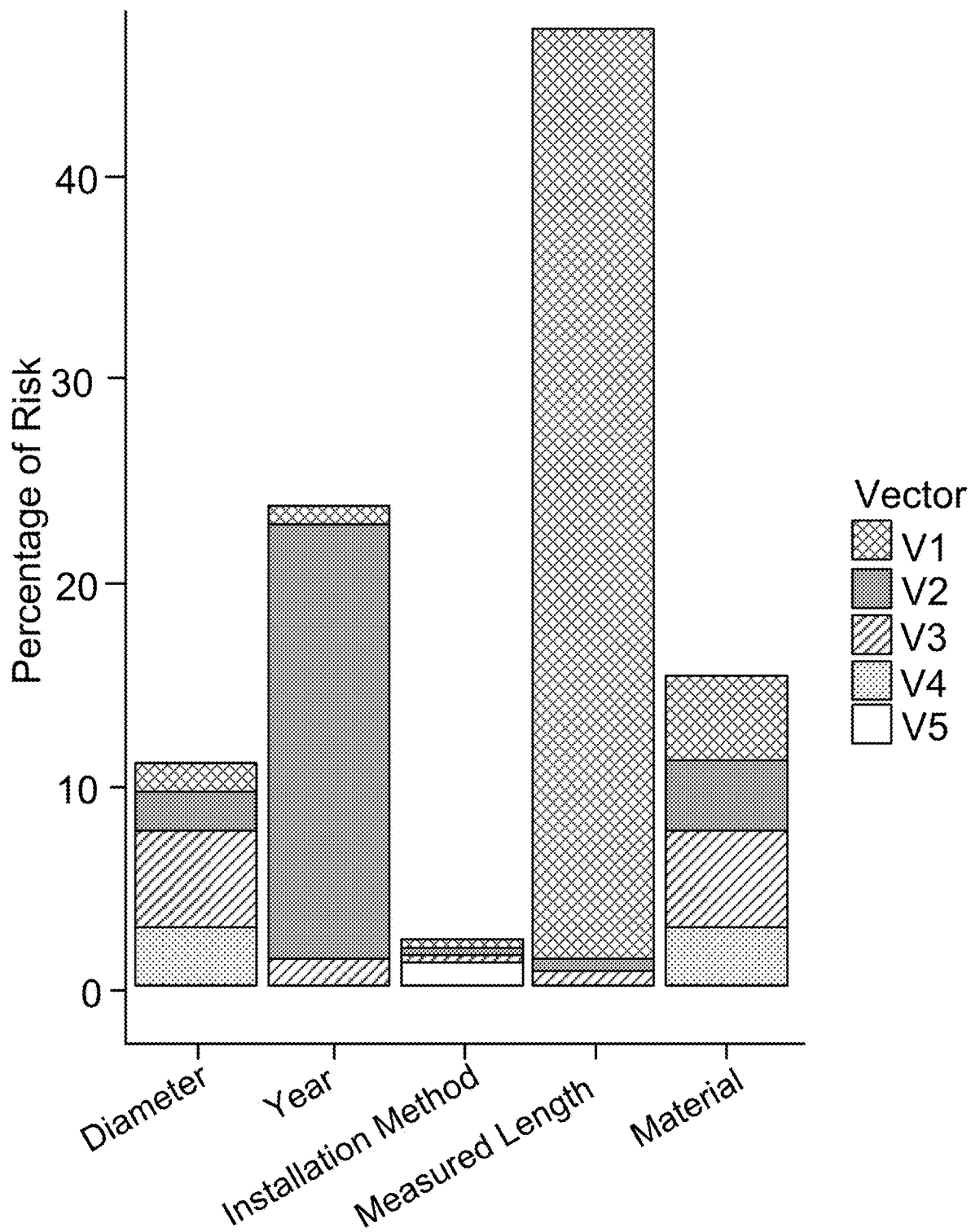
FIG. 10C illustrates an image of feature attribute contributions in accordance with embodiments described herein.

FIG. 10A illustrates an image of contour lines calculated from the heat map gradient in accordance with embodiments described herein. FIG. 10B shows closing the contour lines at a given value to form polygons in accordance with embodiments described herein. The polygons have a contained, and predictable, risk probability which can be tested for accuracy. In this case all of the created polygons contain a total of 30% of all risk while covering less than 7% of the network. FIG. 10C illustrates an image of feature attribute contribution in accordance with embodiments described herein. In this data set, most of the asset installation methods were unknown and the model was able to scale the contribution to have a minimal effect.

Figure 11:
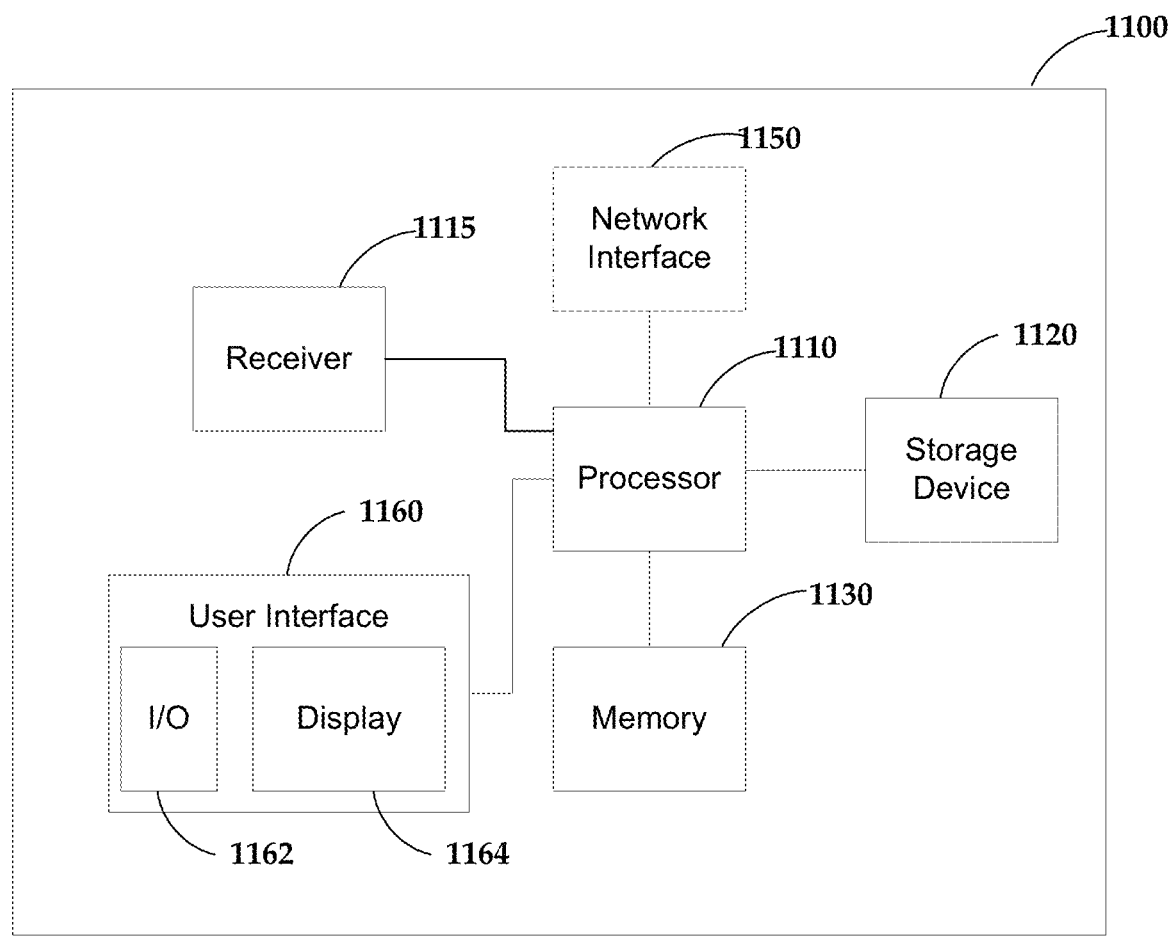
FIG. 11 illustrates a high-level block diagram of a computer that may be used to implement the processes described herein.

The above-described methods can be implemented on a computer using well-known computer processors, memory units, storage devices, computer software, and other components. A high-level block diagram of such a computer is illustrated in FIG. 11. Computer 1100 contains a processor 1110, which controls the overall operation of the computer 1100 by executing computer program instructions which define such operation. The computer program instructions may be stored in a storage device 1120 (e.g., magnetic disk) and loaded into memory 1130 when execution of the computer program instructions is desired. Thus, the steps of the methods described herein may be defined by the computer program instructions stored in the memory 1130 and controlled by the processor 1110 executing the computer program instructions. The computer 1100 may include one or more network interfaces 1150 for communicating with other devices via a network. The computer 1100 also includes a user interface 1160 that enable user interaction with the computer 1100. The user interface 1160 may include I/O devices 1162 (e.g., keyboard, mouse, speakers, buttons, etc.) to allow the user to interact with the computer. Such input/output devices 1162 may be used in conjunction with a set of computer programs. The user interface also includes a display 1164 showing pipe information to the user (e.g., a Data Analyst). The computer may also include a receiver 1115 configured to receive raw data from the one or more sensors and/or templates from the user interface 1160 or from the storage device 1120. FIG. 11 is a high-level representation of possible components of a computer for illustrative purposes and the computer may contain other components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments described herein.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

The invention claimed is:

1. A method for cross-bore risk management and validation, the method comprising:
   defining a cross-bore as an intersection of at least two underground pipes or cables;
   effecting the at least two underground pipes or cables to be located;
   validating a presence of the cross-bore, wherein validation of the presence of the cross-bore is accomplished by:
      receiving at least one dataset comprising a plurality of assets and cross-bore data, wherein the at least two underground pipes or cables are part of the plurality of assets;
      calculating, using a processor, a risk probability value based on the cross-bore data for each asset of the plurality of assets using machine learning techniques;
      spatially distributing the risk probability values around each respective asset;
      producing a graphical output illustrating the risk probability for a specified geographical area based on the spatially distributed risk probability values; and
   modifying a prevention procedure for reducing risk of generating future cross-bores and prior to inspection of potential future cross bores based on the machine learning technique that has evaluated the risk probability values and the presence of the cross-bore having been validated.

2. The method of claim 1, wherein the at least two underground pipes or cables includes natural gas distribution lines, the method further comprising:
   effecting the cross-bore to be avoided, removed or repaired based on the presence of the cross-bore being validated.

3. The method of claim 1, wherein the risk probability value is calculated using orthogonalized quadrature.

4. The method of claim 1, wherein spatially distributing the risk probability values comprises calculating field values at locations radially away.

5. The method of claim 1, wherein spatially distributing the risk probability values comprises calculating field values around line segments.

6. The method of claim 5, wherein calculating field values around line segments comprises distributing probability value perpendicularly along the length of the segment and radially from the end vertices using a field equation.

7. The method of claim 1, wherein producing the graphical output comprises generating a raster image based on the spatially distributed risk probability values.

8. The method of claim 7, further comprising producing contour lines of cumulative risk density using the raster image.

9. The method of claim 8, further comprising generating polygons using the contour lines.

10. The method of claim 9, further comprising prioritizing work based on the polygons.

11. A system for cross-bore risk management and validation, the system comprising:
    at least two underground pipes or cables;
    a cross-bore defined as an intersection of the at least two underground pipes or cables;
    a processor; and
    a memory storing computer program instructions which when executed by the processor cause the processor to perform operations to validate a presence of the cross-bore, the operations comprising:
       receiving at least one dataset comprising a plurality of assets and cross-bore data;
       calculating a risk probability value based on the cross-bore data for each asset of the plurality of assets using machine learning techniques;
       spatially distributing the risk probability values around each respective asset; and
       producing a graphical output illustrating the risk probability for a specified geographical area based on the spatially distributed risk probability values;
    a machine learning engine to evaluate the risk probability values and the presence of the cross-bore having been validated, the machine learning engine configured to reduce risk of generating future cross-bores and prior to inspection of potential future cross bores by effecting a prevention procedure to be modified.

12. The system of claim 11, wherein the at least two underground pipes or cables includes natural gas distribution lines, the system further comprising:
    an instruction for the cross-bore to be avoided, removed or repaired based on the presence of the cross-bore having been validated.

13. The method of claim 11, wherein the risk probability value is calculated using orthogonalized quadrature.

14. The system of claim 11, wherein spatially distributing the risk probability values comprises calculating field values at locations radially away.

15. The system of claim 11, wherein spatially distributing the risk probability values comprises calculating field values around line segments.

16. The system of claim 15, wherein calculating field values around line segments comprises distributing probability value perpendicularly along the length of the segment and radially from the end vertices using a field equation.

17. The system of claim 11, wherein producing the graphical output comprises generating a raster image based on the spatially distributed risk probability values.

18. The system of claim 17, further comprising:
    producing contour lines of cumulative risk density using the raster image; and
    generating polygons using the contour lines.

19. The system of claim 11, wherein the graphical output is a heat map, and wherein the at least two underground pipes or cables includes natural gas distribution lines.

20. A method for cross-bore risk management and prediction, the method comprising:
- defining a cross-bore as an intersection of at least two underground pipes or cables;
- effecting the at least two underground pipes or cables to be located;
- predicting, based on an analysis of uncertainty, a presence of the cross-bore, wherein prediction of the presence of the cross-bore is accomplished by:
  - receiving at least one dataset comprising a plurality of assets and cross-bore data, wherein the at least two underground pipes or cables are part of the plurality of assets;
  - extracting, via a machine learning technique, an inherent relationship between a feature of at least one asset in the plurality of assets and a known cross-bore in the plurality of assets;
  - calculating, using a processor, a spatially distributed risk probability value based on the cross-bore data for each asset of the plurality of assets using the machine learning technique, wherein the machine learning technique continually evaluates parameters of risk against historical data in a recursive data analysis;
  - spatially distributing the risk probability values around each respective asset;
  - producing a graphical output illustrating the risk probability for a specified geographical area based, at least partially, on the spatially distributed risk probability values and the recursive data analysis supplied by the machine learning technique; and
- modifying a prevention procedure for reducing risk of generating future cross-bores and prior to inspection of potential future cross bores based on the machine learning technique that has evaluated the risk probability values and the presence of the cross-bore having been predicted.

* * * * *